US008251164B2

(12) United States Patent
McGee

(10) Patent No.: US 8,251,164 B2

(45) Date of Patent: Aug. 28, 2012

(54) HYBRID VEHICLE DRIVE SYSTEM

(75) Inventor: Gary E. McGee, Oxford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 594 days.

(21) Appl. No.: 12/366,224

(22) Filed: Feb. 5, 2009

(65) Prior Publication Data

US 2010/0193268 A1 Aug. 5, 2010

(51) Int. Cl.
*B60K 6/20* (2007.10)

(52) U.S. Cl. ......................... 180/65.21; 180/65.6; 477/5

(58) Field of Classification Search ............. 180/65.275, 180/65.25, 65.21, 65.22, 53.8, 65.6, 65.24, 180/65.7; 477/115, 3, 5; 475/210, 196; 474/70, 474/71, 69

See application file for complete search history.

(56) References Cited

U.S. PATENT DOCUMENTS

| | | | | |
|---|---|---|---|---|
| 4,454,786 | A * | 6/1984 | Stockton | 475/54 |
| 5,249,637 | A * | 10/1993 | Heidl et al. | 180/65.25 |
| 5,558,173 | A * | 9/1996 | Sherman | 180/53.8 |
| 5,558,175 | A * | 9/1996 | Sherman | 180/65.25 |
| 5,700,212 | A * | 12/1997 | Meckstroth | 474/70 |
| 5,993,351 | A * | 11/1999 | Deguchi et al. | 477/5 |
| 6,048,288 | A * | 4/2000 | Tsujii et al. | 477/5 |
| 6,203,468 | B1 * | 3/2001 | Nitta et al. | 477/5 |
| 6,396,165 | B1 * | 5/2002 | Nagano et al. | 903/903 |
| 6,453,856 | B1 * | 9/2002 | Lehmann et al. | 123/90.11 |
| 6,852,063 | B2 * | 2/2005 | Takahashi et al. | 477/5 |
| 6,878,094 | B2 * | 4/2005 | Kitamura et al. | 477/5 |
| 7,032,385 | B2 * | 4/2006 | Gray, Jr. | 60/716 |
| 7,086,981 | B2 * | 8/2006 | Ali et al. | 475/210 |
| 7,370,715 | B2 * | 5/2008 | Colvin et al. | 180/65.28 |
| 7,703,353 | B2 * | 4/2010 | Janson | 74/665 T |
| 7,727,115 | B2 * | 6/2010 | Serkh | 477/115 |
| 7,954,580 | B2 * | 6/2011 | Usoro | 180/65.275 |
| 2007/0186896 | A1 * | 8/2007 | Carroll et al. | 123/198 R |
| 2007/0213151 | A1 | 9/2007 | Usoro | |
| 2007/0265126 | A1 * | 11/2007 | Janson et al. | 475/5 |
| 2008/0149405 | A1 * | 6/2008 | Hladun et al. | 180/53.8 |

FOREIGN PATENT DOCUMENTS

| | | |
|---|---|---|
| DE | 10337222 A1 | 3/2005 |

* cited by examiner

*Primary Examiner* — Hau Phan

(74) *Attorney, Agent, or Firm* — Quinn Law Group, PLLC

(57) ABSTRACT

A drive system is provided for a hybrid vehicle that has an engine with a crankshaft and a motor/generator having a shaft member. The drive system includes a starter sprocket connected for rotation with the shaft member and a crankshaft sprocket connected for rotation with the crankshaft. A chain is engaged with the starter sprocket and the crankshaft sprocket. A planetary gear set is configured to multiply torque of the motor/generator, with the multiplied torque being provided to the engine crankshaft via the sprockets and the chain to start the engine.

7 Claims, 2 Drawing Sheets

HYBRID VEHICLE DRIVE SYSTEM

TECHNICAL FIELD

The invention relates to a drive system for a hybrid vehicle.

BACKGROUND OF THE INVENTION

An electric hybrid vehicle includes an internal combustion engine and one or more electric motor/generators. Some hybrid vehicles utilize one or more motor/generators to provide driving torque in an electric-only operating mode or in combination with the engine, such as an electrically-variable operating mode. The motor/generators may also be used to start the engine from a cold start, from an auto-stop (idle, engine off), or when transitioning from the electric-only mode to the electrically-variable mode A typical (non-hybrid) accessory drive system transfers driving forces from the engine to automotive accessories via a flexible drive belt wrapped around pulleys on the engine and the accessories. The accessories typically include an alternator. For hybrid powertrains, belt-alternator-starter (BAS) systems employ a combined starter and alternator motor/generator mounted with respect to other components of the accessory drive system, such as a pump, an air conditioner, or other accessories. The BAS system motor/generator is typically mounted and packaged in the same way as a traditional alternator and drives the accessory and engine components via a belt and pulley system.

SUMMARY OF THE INVENTION

A drive system is provided for a hybrid vehicle that has an engine with a crankshaft and a motor/generator having a shaft member. The drive system includes a starter sprocket connected for rotation with the shaft member and a crankshaft sprocket connected for rotation with the crankshaft. A chain is engaged with the starter sprocket and the crankshaft sprocket. A planetary gear set is configured to multiply torque of the motor/generator, with the multiplied torque being provided to the engine crankshaft via the sprockets and the chain to start the engine. In some embodiments, the chain is a timing chain also used to control relative rotation of the crankshaft with camshafts driven by the chain via camshaft sprockets engaged with the chain. Alternatively, a separate chain may be used for driving the camshaft sprockets via the starter sprocket, or the dedicated chain connecting the starter sprocket and the crankshaft sprocket may be used on a vehicle that does not have camshafts.

Accordingly, a drive system for hybrid applications is created that is packaged in relatively the same packaging space as used for non-hybrid accessory belt drive systems. By implementing a planetary gear set, sufficient torque multiplication is achieved so that the size of the crankshaft sprocket and the power requirements of the motor/generator remain relatively small. A chain is implemented to drivingly connect the starter sprocket and the crankshaft sprocket. The chain may be an existing timing chain. Chain and sprocket drives typically provide better performance than belt and pulley drives in low ambient temperatures, as belts may slip due to stiffening or loss of friction due to frost buildup between the pulley and belt. The motor/generator can function as both a generator, providing the functions of an accessory drive alternator, and as a starter motor. Also, a single chain can drive all sprockets, as desired tension on a chain is not limited to an overall length as with a belt. Thus, packaging problems and the number of components are minimized. For example, a separate tensioning system as necessary with a dedicated belt alternator starter is not required with a chain.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
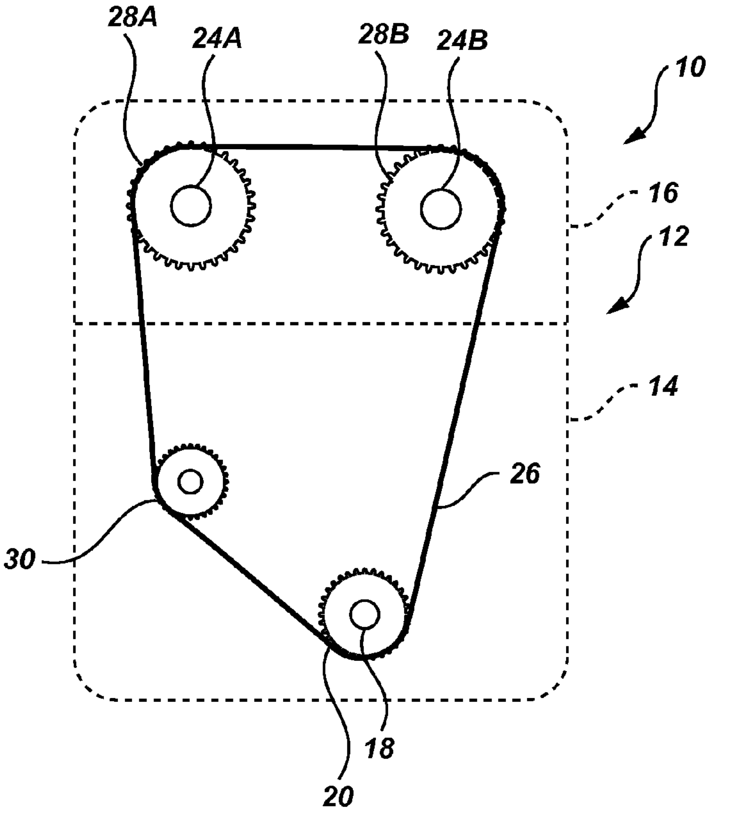
FIG. 1 is a schematic end view of a vehicle engine showing a timing chain connecting a crankshaft sprocket, a motor/generator starter sprocket, and camshaft sprockets.

Referring to the drawings, wherein like reference numbers refer to the same components throughout the several views, FIG. 1 shows a portion of a hybrid vehicle 10 with an engine 12 that includes an engine block 14 and a camshaft cover 16 (both shown in phantom) secured to the engine block 14, as understood by those skilled in the art. The engine 12 has a crankshaft 18 with a crankshaft sprocket 20 mounted to an end thereof. Overhead camshafts 24A, 24B are operatively connected to the crankshaft 18 and are driven by the crankshaft 18 via a timing chain 26 engaged with camshaft sprockets 28A, 28B secured for rotation with the camshafts 24A, 24B. Links of timing chain 26 engage with teeth on the sprockets 28A, 28B to deliver precise relative rotation and timing of the crankshaft 18 and camshafts 24A, 24B.

Figure 2:
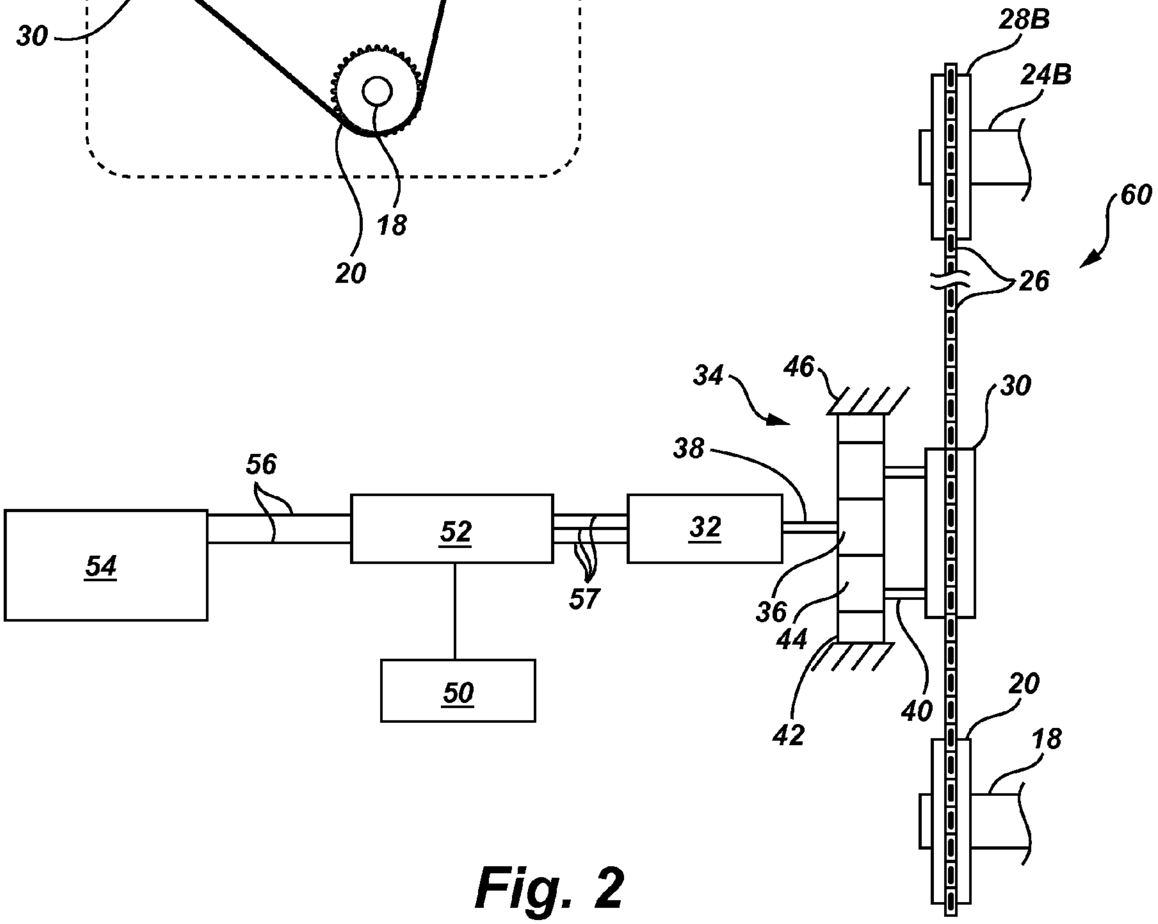
FIG. 2 is a schematic side view illustration of a drive system for the vehicle engine of FIG. 1, including the crankshaft sprocket, motor/generator starter sprocket, and camshaft sprockets of FIG. 1, and a motor/generator connected via a planetary gear set to the starter sprocket.

A starter sprocket 30 is also engaged with the timing chain 26 via teeth engaging with links of the chain 26. Referring to FIG. 2, the starter sprocket 30 is operatively connected to a motor/generator 32 via a planetary gear set 34 to allow the motor/generator 32 to be used to start the engine 12 by rotating the crankshaft 18 via the timing chain 26 interconnecting the sprockets 20, 28A, 28B, 30 (camshaft sprocket 28A not visible as it is located directly behind camshaft sprocket 28B in FIG. 2). Specifically, the planetary gear set 34 includes a sun gear member 36 secured for rotation with a motor/generator shaft 38 driven by a rotor of the motor/generator 32. The planetary gear set 34 also includes a carrier member 40 and a ring gear member 42. The carrier member 40 supports pinion gears 44 that mesh with both the sun gear member 36 and the ring gear member 42. The starter sprocket 30 is mounted to the carrier member 40 for rotation therewith. The ring gear member 42 is grounded to a stationary member 46. The stationary member 46 may be the engine block 14 or any another stationary component, such as a transmission casing.

The motor/generator 32 is controllable via a controller 50 operatively connected to a power inverter 52 to provide control signals thereto that cause the motor/generator 32 to act either as a motor or a generator. The power inverter 52 converts direct current provided by an energy storage device 54 along transfer elements 56 to alternating current supplied along transfer elements 57 required for the motor/generator 32, or alternating current provided by the motor/generator 32 when acting as a generator (such as in a regenerative braking mode) to direct current along transfer elements 56 to be stored in the energy storage device 54. When acting as a motor, electric power is provided along transfer elements 56 from energy storage device 54 through the inverter 52 to power the motor/generator 32 to drive the shaft member 38 and the sun gear member 36 connected thereto. Torque of the sun gear member 36 is multiplied via the planetary gear set 34 to provide a greater torque at the carrier member 40, so that the torque of the carrier member to the torque of the sun gear member is according to the formula:

1+R/S, wherein R is the number of teeth of the ring gear member and S is the number of teeth of the sun gear member.

The planetary gear set 34 is configured with appropriate tooth counts to provide a desired torque multiplication, such as between a factor of two to three, from the sun gear member 36 to the carrier member 40. This provides sufficient torque at the starter sprocket 30 secured for rotation with the carrier member 40 to rotate the crankshaft 18 to start the engine. Such starts may be cold starts of the engine 12 after the vehicle has been stopped for a prolonged period, after an auto-stop (idle, engine-off), or starts when transitioning from electric-only, engine-off to an engine-on mode, such as an electrically-variable mode. By multiplying the torque via the planetary gear set 34, the crankshaft sprocket 20 need not be enlarged or oversized, and thus a typical timing relation between the crankshaft 18 and camshafts 24A, 24B may be maintained. Thus, a drive system 60 that includes the motor/generator 32, the sprockets 20, 30, 28A, 28B and the chain 26 enables starting of the engine 12 via torque transfer to crankshaft 18 with the precision of a chain 26, avoiding slip problems that may occur with a belt and pulley system. A single chain 26 may be used to interconnect all sprockets 20, 30, 28A, 28B, as slack encountered with long belts is avoided, and the planetary gear set enables relatively small diameter sprockets 20, 30.

Figure 3:
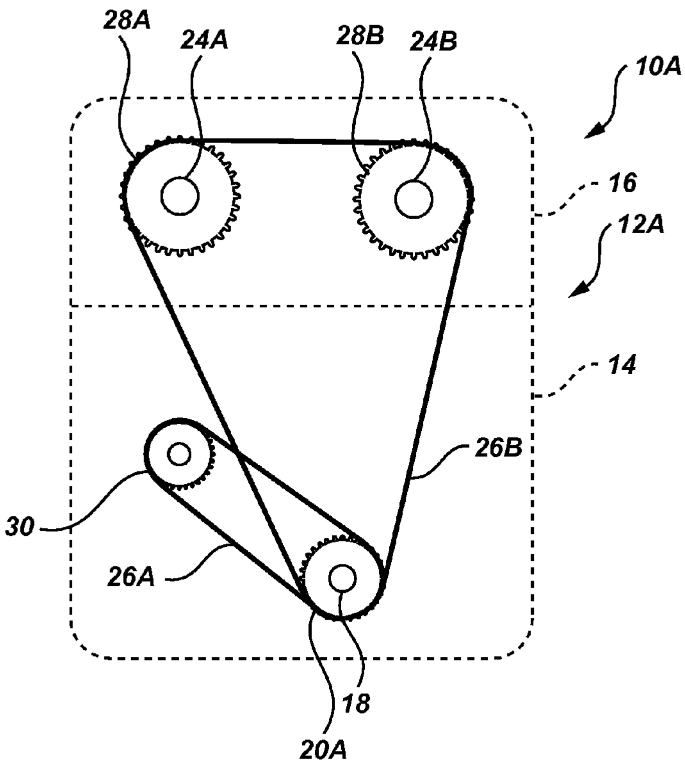
FIG. 3 is a schematic end view of an alternative embodiment of a vehicle engine showing a dedicated chain connecting a crankshaft sprocket and a motor/generator starter sprocket, with a separate timing chain connecting the crankshaft sprocket and the camshaft sprockets.
Figure 4:
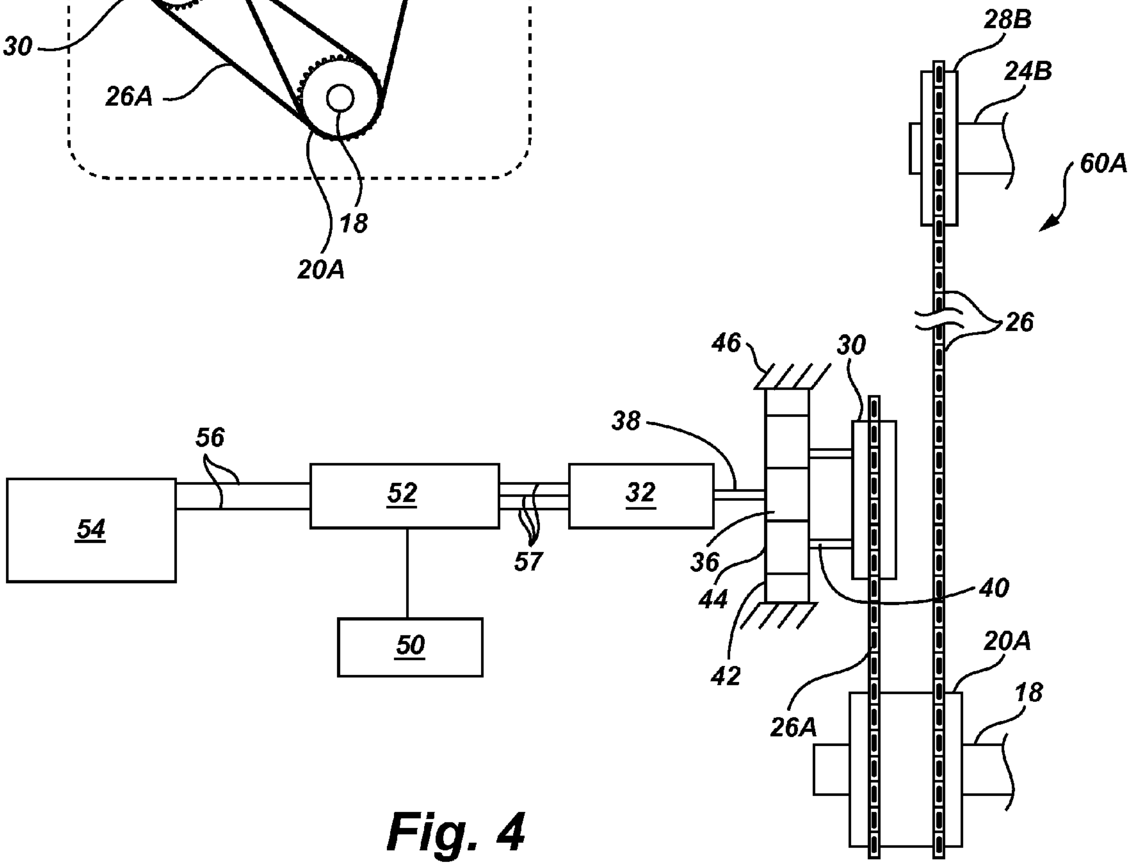
FIG. 4 is a schematic side view illustration of a drive system for the vehicle engine of FIG. 3.

Referring to FIG. 3, an alternate embodiment of a vehicle 10A with an engine 12A is illustrated with a dedicated chain 26A used to transfer torque between the crankshaft sprocket 20A and starter sprocket 30, and a separate timing chain 26B used to transfer torque between the crankshaft sprocket 20A and the camshaft sprockets 28A, 28B. The crankshaft sprocket 20A has two sets of teeth or an elongated set of teeth to allow separate connection of the chains 26A, 26B, with the chains 26A, 26B mounted axially spaced from one another as illustrated in FIG. 4. All other components are configured to function in the same manner as described with respect to the drive system 60 of FIGS. 1 and 2. Thus, a drive system 60A that includes the motor/generator 32, the sprockets 20A, 30, 28A, 28B and the chains 26A, 26B enables starting of the engine 12A via torque transfer to crankshaft 18 with the precision of a chain 26A.

While the best modes for carrying out the invention have been described in detail, those familiar with the art to which this invention relates will recognize various alternative designs and embodiments for practicing the invention within the scope of the appended claims.

The invention claimed is:

1. A drive system for a hybrid vehicle with an engine having a crankshaft and a motor/generator having a shaft member comprising:

a starter sprocket connected for rotation with the shaft member;

a crankshaft sprocket mounted on the crankshaft to rotate at the same speed as the crankshaft;

a chain engaged with the starter sprocket and the crankshaft sprocket;

a planetary gear set configured to multiply torque of the motor/generator, with the multiplied torque being provided to the engine crankshaft via the sprockets and the chain to start the engine a stationary member; and wherein the planetary gear set has a first, a second and a third member; wherein the first member is continuously connected for rotation at the same speed as the shaft member, the second member is continuously connected for rotation at the same speed as the starter sprocket, and the third member is continuously grounded to the stationary member.

2. The drive system of claim 1, wherein the engine has camshafts positioned relative to the crankshaft; and wherein the chain is a timing chain also engaged with camshaft sprockets mounted on the camshafts to rotate at the same speed as the camshafts.

3. The drive system of claim 1, wherein the first member is a sun gear member, the second member is a carrier member, and the third member is a ring gear member.

4. The drive system of claim 1, further comprising:

an energy storage device;

a power inverter operatively connecting the energy storage device with the motor/generator; and a controller operable to control the motor/generator to operate as a generator to convert torque from the engine transferred through the chain to electrical energy stored in the energy storage device.

5. A drive system for a hybrid vehicle with an engine having a crankshaft and camshafts and with a motor/generator having a shaft member, comprising:

a starter sprocket operatively connected for rotation with the shaft member;

a crankshaft sprocket mounted on the crankshaft to rotate at the same speed as the crankshaft;

camshaft sprockets mounted on the camshafts to rotate at the same speed as the camshafts;

a timing chain engaged with the starter sprocket, the crankshaft sprocket, and the camshaft sprockets; wherein the motor/generator is controllable to provide torque to and receive torque from the engine via the timing chain and sprockets a stationary member; and a planetary gear set having a first, a second and a third member; wherein the first member is continuously connected for rotation at the same speed as the shaft member, the second member is continuously connected for rotation at the same speed as the starter sprocket, and the third member is grounded to the stationary member;

wherein the planetary gear set is configured to multiply torque of the motor/generator, with the multiplied torque being provided to the engine crankshaft via the sprockets and the timing chain to start the engine.

6. The drive system of claim 5, wherein the first member is a sun gear member, the second member is a carrier member, and the third member is a ring gear member.

7. The drive system of claim 5, further comprising:

an energy storage device;

a power inverter operatively connecting the energy storage device with the motor/generator; and a controller operable to control the motor/generator to operate as a generator to convert torque from the engine transferred through the chain to electrical energy stored in the energy storage device and to operate as a motor to drive the crankshaft.

* * * * *